United States Patent [19]
Su et al.

[11] Patent Number: 6,140,445
[45] Date of Patent: *Oct. 31, 2000

[54] SILANE FUNCTIONAL OLIGOMER

[75] Inventors: Shiu-Chin Huang Su, Croton-on Hudson, N.Y.; Herbert E. Petty, Bethel, Conn.; Fredrick D. Osterholtz, Pleasantville, N.Y.

[73] Assignee: Crompton Corporation, Middlebury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/062,047

[22] Filed: Apr. 17, 1998

[51] Int. Cl.$^7$ ..................................................... C08G 77/68
[52] U.S. Cl. .................................. 528/15; 528/35
[58] Field of Search ........................................... 528/35, 15

[56] References Cited

U.S. PATENT DOCUMENTS

| | | |
|---|---|---|
| 3,284,406 | 11/1966 | Nelson . |
| 4,499,150 | 2/1985 | Dowbenko et al. . |
| 4,499,151 | 2/1985 | Dowbenko et al. . |
| 4,614,766 | 9/1986 | Schimmel et al. . |
| 4,714,738 | 12/1987 | Chang et al. . |
| 4,737,562 | 4/1988 | Chaudhury et al. . |
| 4,753,976 | 6/1988 | Yoshioka et al. . |
| 4,871,827 | 10/1989 | Klosowski et al. . |
| 4,888,380 | 12/1989 | Kamis et al. . |
| 4,888,404 | 12/1989 | Klosowski et al. . |
| 4,950,779 | 8/1990 | Wengrovius et al. . |
| 5,162,426 | 11/1992 | Hazan et al. . |
| 5,210,168 | 5/1993 | Bergstrom et al. . |
| 5,244,469 | 9/1993 | Hazan et al. . |
| 5,244,959 | 9/1993 | Hazan et al. . |
| 5,250,605 | 10/1993 | Hazan et al. . |
| 5,498,666 | 3/1996 | Nambu et al. . |
| 5,527,936 | 6/1996 | Dindi et al. . |
| 5,530,152 | 6/1996 | Dindi et al. . |
| 5,532,027 | 7/1996 | Nordstrom et al. . |
| 5,739,238 | 4/1998 | Petty et al. . |

FOREIGN PATENT DOCUMENTS

| | | |
|---|---|---|
| 0124805 A2 | 11/1984 | European Pat. Off. . |
| 0499233 A2 | 8/1992 | European Pat. Off. . |
| 0801112 A2 | 4/1997 | European Pat. Off. . |
| 0890598 A1 | 12/1997 | European Pat. Off. . |
| WO 95/19982 | 7/1995 | WIPO . |
| WO95/19982 | 7/1995 | WIPO . |
| WO 96/16125 | 5/1996 | WIPO . |
| WO 96/397488 | 12/1996 | WIPO . |
| WO96/39468 | 12/1996 | WIPO . |
| WO 97/25374 | 7/1997 | WIPO . |
| WO 97/44402 | 11/1997 | WIPO . |
| WO97/44402 | 11/1997 | WIPO . |
| WO 99/02580 | 1/1999 | WIPO . |

*Primary Examiner*—Robert Dawson
*Assistant Examiner*—Jeffrey B. Robertson
*Attorney, Agent, or Firm*—Vidas, Arrett and Steinkraus

[57] ABSTRACT

Alkoxy silane oligomers which have a non-hydrolyzable carbon bridged bond to another silane functionality are taught herein, as well as their manufacture and utility.

14 Claims, No Drawings

SILANE FUNCTIONAL OLIGOMER

Silanes are known as cross-linking agents which are useful in coatings and adhesives. One such type of coating is "clearcoats" for automobiles, which provide a clear protective layer over pigmented basecoats. Such coatings have been disclosed in U.S. Pat. Nos. 5,250,605, 5,162,426 and 5,244,959 to Hazan et al.; U.S. Pat. Nos. 4,499,150 and 4,499,151 to Dowbenko et al.; and PCT Publication No. WO 95/19982.

Some of this art teaches the utility of silane oligomers or interpolymers for such coatings. For example, U.S. Pat. Nos. 4,499,150 and 4,499,151 teach a copolymer of an ethylenically unsaturated alkoxysilane with another ethylenically unsaturated group made by free radical polymerization. Because of the formulation chemistry, these interpolymers are limited in structure and functionalities.

Moreover, U.S. Pat. No. 5,432,246 to Fenn et al. discloses a silane oligomer made from a 2° amino-alkoxy silane, a polyisocyanate and optionally a single isocyanate group. Such oligomers are based on the reaction of the amine with the isocyanate to form a substituted urea. In these oligomers all the isocyanate groups have reacted with the amine groups, so no such functionalities are present. Further, urea structures may increased viscosity to an unwanted degree.

It is desirable to have coatings which incorporate alkoxy silane functionalities because siloxane bonds provide good chemical resistance; however, appearance (gloss and DOI (distinctiveness of image)), mar resistance and lack of cracking all are other properties required for coatings, which properties are deficient in one respect or another in the known prior art.

SUMMARY OF THE INVENTION

The present invention teaches the formation and use of siloxane oligomers having a plurality of alkoxy groups, which oligomers have attached thereto, by other than an Si—O bond, further silyl functionalities. These oligomers may be of the formula

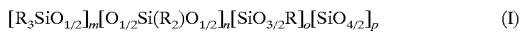

$$[R_3SiO_{1/2}]_m[O_{1/2}Si(R_2)O_{1/2}]_n[SiO_{3/2}R]_o[SiO_{4/2}]_p \quad (I)$$

wherein

Each R is selected individually from the group consisting of B, $R^1$, —$OR^1$ and W;

wherein

B is a silyl functionality group bridged by other than an Si—O bond to the Si atom of the siloxane oligomer backbone;

each $R^1$ is individually a saturated or aromatic hydrocarbon group of 1 to 12 carbon atoms;

each W individually is a monovalent radical;

with the provisos that at least one R is a B and at least one quarter of all R groups are —$OR^1$;

m=2 to 20;

n=0 to 50;

o=0 to 20; and p=to 5.

DETAILED DESCRIPTION OF THE INVENTION

Structure

In structure I above, B is a silyl functionality group which is attached to the siloxane oligomer by other than an Si—O bond. There must be at least one B per siloxane oligomer, which preferably is internal to the oligomer. More preferably there are at least two B groups per oligomer. Usually, if a B group is attached to a silicon atom of the siloxane backbone, the other R group(s) on that silicon atom is an alkoxy group.

The divalent linking group between the silicon atom of the silyl functionality group and the silicon atom of the siloxane oligomer may not contain an Si—O bond, but otherwise may include any heteroatoms, e.g., it may be alkylene, arylene, alkarylene, polyalkylene oxide, polyurethane, isocyanurate. The linking group may be branched and may be olefinically or aromatically unsaturated. Preferably the bridging group is an alkylene of 2 to 12 carbon atoms, e.g., cyclo aliphatic (e.g., 1,4 diethylene-cyclohexane or 1,3,5 triethylene cyclohexyl) or linear (e.g., butylene, propylene). The divalent linking group may be substituted with silyl or siloxy functions, as well as unsaturated groups. Indeed, the divalent linking group may form part of a backbone with relatively linear siloxane chains attached to either end of the group. An exemplary bridging group is 2,4 ethylene, 1-vinyl cyclohexane.

The silyl functionality at the end of the divalent bridging group may be an alkoxysilane, halo silane, a siloxane or may have further functionalities. Preferably, the silane is an alkoxy silane, more preferably a dialkoxy silane and most preferably a trialkoxy silane.

A preferred B group may be represented as —$C_fH_{2f}$—$SiR^2_g(X)_{3-g}$ wherein f=2 to 12, g=0 to 2, X is a halogen or —$OR^2$, and each $R^2$ is selected from W and $R^1$. More preferably f=2 to 6, g=3 and X is —$OR^2$, and most preferably wherein $R^2R^1$, most preferably methyl. Preferable B's are —$(CH_2)_2Si(OCH_3)_3$; —$(CH_2)_2Si(OC_2H_5)_3$—$(CH_2)_2Si(OCH_3)_2(CH_3)$; —$(CH_2)_2Si(OCH_3)_2Cl$; —$C_2H_4(C_6H_9)(C_2H_4Si(OCH_3)_3)_2$; —$C_2H_4(C_5H_8)C_2H_4Si(OC_2H_5)_3$; and —$C_2H_4Si(OCH_3)_2(OSi(OCH_3)_3)$.

W is a monovalent radical and may be an unsaturated non-aromatic hydrocarbon, hydroxy, an amine, an ester, a polyalkylene oxide, a thioester, an amide, a carbamate, an epoxy, cyano, polysulfide, or isocyanurate. Specific examples of W include gamma propyl amino, gamma propyl glycidoxy, acetoxy ethyl, propylene glycol, gamma propyl carbamate, dimethoxy phenyl propyl, n-octenyl, 2-ethyl, 3,4 epoxy cyclohexane, or cyano ethyl or an alkyl radical substituted with such groups. Usually if a W group is attached to a silicon atom, the other R group(s) on that silicon atom is a hydrocarboxy group (—$OR^1$), preferably an alkoxy.

$R^1$ is a saturated or aromatic hydrocarbon of 1 to 12 carbon atoms, e.g., alkyl (linear or branched) cycloalkyl, aryl or alkaryl. Exemplary $R^1$ are i-propyl, i-butyl, t-butyl, n-pentyl, cyclohexyl, phenyl, benzyl or napthyl. Specifically, methyl or ethyl are preferred for $R^1$.

Preferably m+n+o+p<50, more preferably <30 and most preferably <15. Preferably m is 2 to 4, n is to 1 to 15, o is 0 to 2 and p is 0 to 1, though it is understood there may be distributions of the number of siloxy units within a given oligomer batch.

Preferably there are multiple alkoxy groups available on the oligomer so that upon curing these oligomers may cross-ink, i.e., form Si—O—Si bonds with each other or with a silylated polymer or inorganic material. Thus, R is —$OR^1$, more preferably ethoxy or methoxy, in at least one quarter of the R groups, more preferably in at least half of the R groups, while the remainder of the R groups are B or W groups, more preferably, trialkoxysilylethyl groups, most preferably trimethoxysilylethyl. In such embodiments p=0, o=0, m=2 and n=2 to 20.

A preferred formula for the oligomer is
with R, $R^1$, m, n and o as above and with $R^1$ preferably methyl, o=0, m=2 and n=0 to 15. Most preferably, all R's are either $-OR^1$ or B. Specific examples of the oligomer include
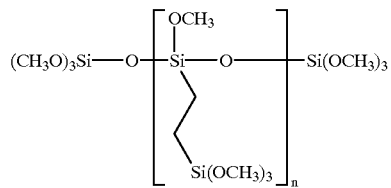
(a)
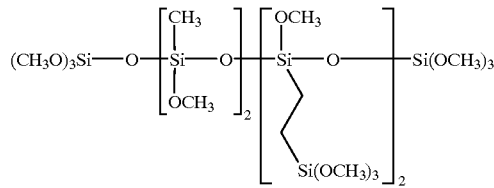
(b)
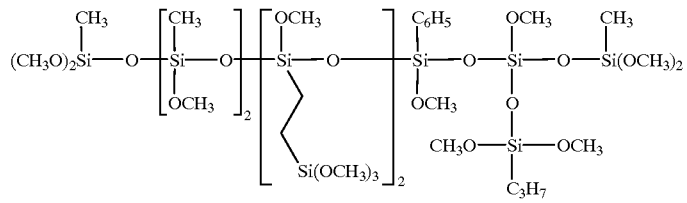
(c)
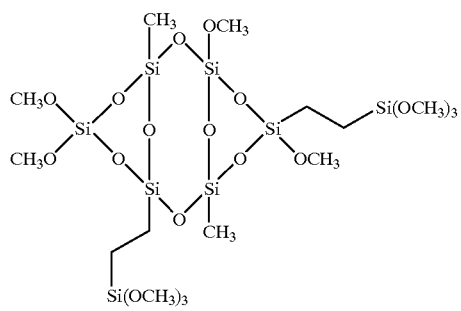
(d)
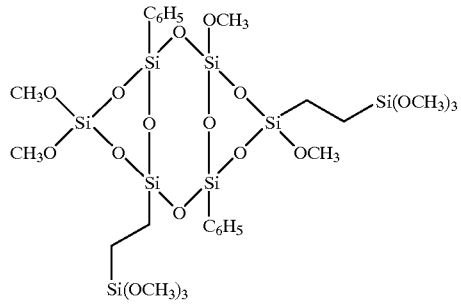
(e)

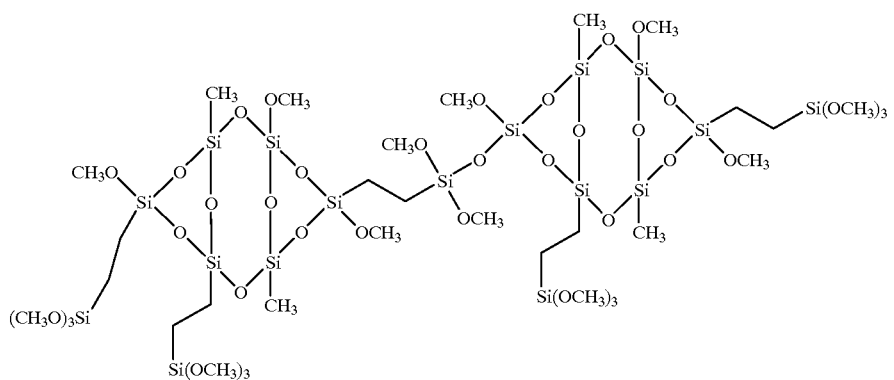
(f)
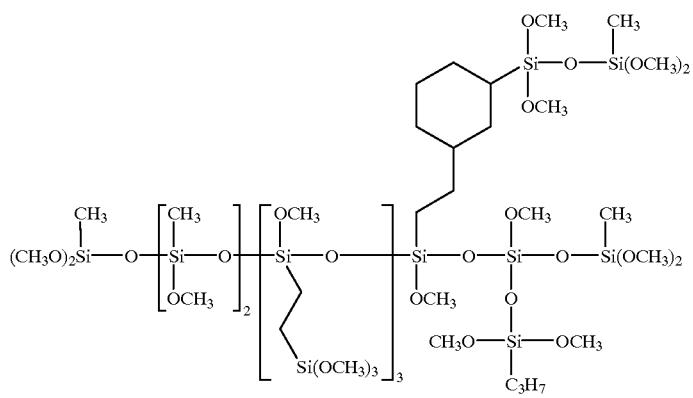
(g)
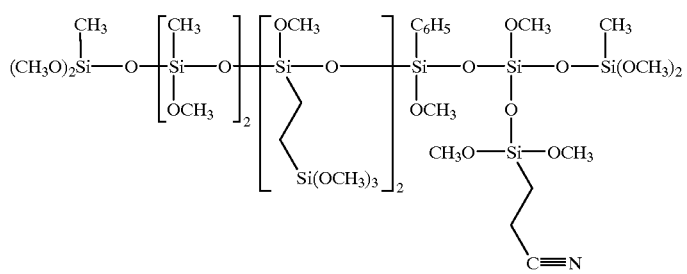
(h)
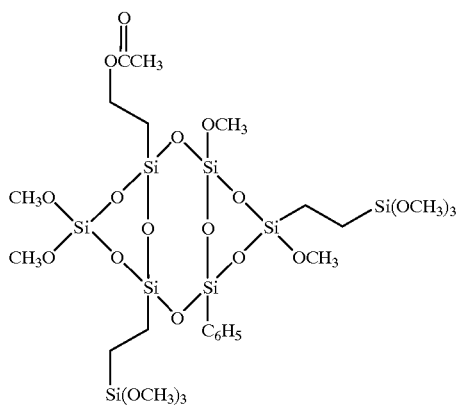
(i)

-continued

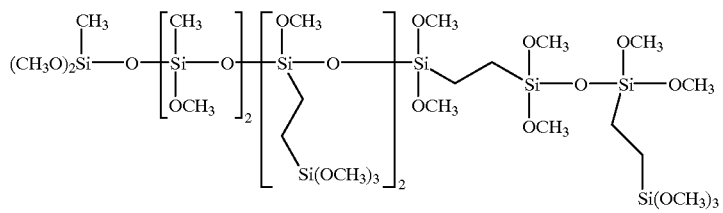

(j)

It is preferred that the oligomer has a viscosity of 0.5 to 500 csks or more preferably 0.5 to 200 csks (25° C.). As is clear to one of skill in the art, the viscosity of the oligomer may be adjusted by adjusting the number of siloxy groups in the oligomer. In most cases the viscosity will be adjusted for a specific application to ensure that the composition containing the oligomer will spread over a specific substrate or be sprayable.

Method of Manufacture

The oligomers of the present invention may be formed in a two step process or one step process. In the two step process a condensation reaction is followed by a hydrosilation reaction. Such a two step process is (1) a siloxane oligomer with olefinically (ethylenic or acetylenic) unsaturated groups is produced by condensation from an unsaturated alkoxy silane, and optionally, other alkoxy silanes; and (2) hydrosilylating the oligomer produced in step (1) with an alkoxy hydrido silane. Alternatively the two steps are, (1) a siloxane oligomer is formed by condensation from alkoxy hydrido silanes, and optionally, other alkoxy silanes, which (2) oligomer is hydrosilylated with an olefinically unsaturated alkoxy silane. In the one step process bis alkoxy silane(s), wherein the silicon atoms are attached by other than an Si—O bond are condensed, preferably with other alkoxy silanes, to form a siloxane oligomer.

The condensation may be performed according to either U.S. Pat. No. 4,950,779 or 5,210,168, which are incorporated herein by reference. In the two step process, the first starting material is either an olefinically unsaturated alkoxy silane or a hydrido alkoxy silane, which preferably are trialkoxysilanes. The alkoxy groups may be $C_1-C_{12}$, may be branched cyclic or include aryl groups, and may include heteroatoms. The preferred alkoxy groups are methoxy, ethoxy, isopropoxy, n-butoxy and cyclohexyloxy. Examples of the unsaturated group may be vinyl, acryl, methacryl, acrylate, acetylenyl, or any 1,2 unsaturated olefin. There may be different such unsaturated groups within one oligomer.

The starting material for the one step process is a bis alkoxy silane. Preferably a bis dialkoxy silane or bis trialkoxy silane is the starting material. Exemplary such silanes are 1, 4-bis(trimethoxysilylethyl)cyclohexane; 1,3,5tris(trimethoxysilylethyl)cyclohexane; and 1,4-bis(triethoxysilyl)butane. While such starting materials are more difficult to manufacture than the above starting materials, they offer two advantages, a one step process and the avoidance of the potential of unsaturated groups being left in the oligomer.

During condensation, other optional alkoxy silanes may be incorporated into the oligomer including, but not limited to, aryl silanes, alkyl silanes, amino silanes, epoxy silanes, amido silanes, carbamato silanes, cyano silanes, polyalkylene oxide silanes, ester silanes, or isocyanurate silanes. Said alkoxy silanes may be bis or tris alkoxy silanes. Specific examples of these silanes include: bis(trimethoxysilylethyl)benzene, tris(2-trimethoxysilylethyl)cyclohexane, 3-glycidoxypropyltrihethoxysilane, 3-aminopropyltriethoxysilane, 3-aminopropylmethyldiethoxysilane, and methyl N—(3-trimethoxysilylpropyl) carbamate. These silanes must have at least one alkoxy group (in which case they would be end units on the oligomer), but preferably are di- or tri- alkoxy silanes.

Moreover, in the condensation dialkoxy siloxy units may be inserted into the oligomer to affect the cross-linking, surface active and viscoelastic properties of the oligomer. Said may be done by using tetraalkoxy silanes, e.g., tetramethoxy or tetraethoxy silane.

The condensation of the alkoxy silane monomers is performed in the presence of a carboxylic acid (e.g., acetic or formic acid) or water. Additionally a strong condensation catalyst may be used, e.g., an ion exchange resin. The other reaction conditions of the condensation will depend on the monomeric silanes; however, temperature should be in the range of 20 to 60° C.

In the two step process the product of the condensation is a siloxane oligomer containing either (1) at least one unsaturated functionality which is attached to a silicon atom on the siloxane backbone by other than an Si—O bond or (2) at least one silanic hydride. The unsaturated or silanic hydride siloxane oligomer produced in Step 1 is reacted with either a hydrido silane or an olefinically unsaturated silane, respectively, in the presence of a catalyst by noble metal catalyst chemistry or by free radical chemistry. Such hydrosilation, for example, may be accomplished according to U.S. Pat. Nos. 5,530,452 and 5,527,936, which are incorporated herein by reference. It is preferred that the hydrido silane or olefinically unsaturated silane be trialkoxy to afford a great deal of cross-inking to the resulting oligomer. During reaction, the hydrogen on the hydrido silane is reactive with the unsaturation(s) groups and a bond is formed between the silicon atom and the unsaturated group (which, if ethylenic, is saturated in the process). In some cases there may be unsaturated sites left on the oligomer.

The resulting oligomer is of the structure above.

Utility

These oligomers are useful in coatings or adhesives, especially those where alkoxy silanes are a component. In one application oligomers may be used to moisture cure said adhesive or coating. The oligomers may be used as a reactive diluents, in that they have little volatility will not contribute to volatile organic compounds (VOCs) and have an adjustable viscosity to match an application, or to dilute another composition to make the entire composition spreadable or sprayable. Moreover, there is the benefit to the use of these oligomers in that the only VOC's which may be produced with the use of these oligomers may be the alcohols of the alkoxy groups.

Said oligomers may be used in masonry waterproofing, paints, corrosion protection systems, and on substrates such as cement, metal, polymers (PVC, PVS, EPDM, PE, PP, ABS, EPR, BR, silicone, polycarbonate, etc.), wood, a paint layer (as a primer) or rubber. Moreover, oligomers may be used in silicate hardcoats.

The oligomers may be used by themselves or with other monomers, cross-link epoxy silane with polyacid, and if the oligomer is unsaturated, copolymerized with other acetylenic unsaturated monomer. Specifically said oligomers are useful in the aforementioned clearcoats. Said clearcoats may be made per U.S. Pat. No. 5,244,696 to Hazan et al., which is incorporated herein by reference. Clearcoats made with the present oligomer have good mar resistance, good gloss (and gloss retention), chemical resistance, distinctiveness of image (DOI), and stain resistance.

Coating compositions incorporating the oligomer of this invention can include a number of ingredients to enhance preparation of the composition as well as to improve final properties of the coating composition and the finish. For example, it is often desirable to include about 20 to 90%, preferably 20 to 60%, by weight of the composition, of a film-forming reactive silane polymer. Such polymer typically has number average molecular weight of about 500 to 10,000.

The silane polymer is the polymerization product of about 30–95%, preferably 40–60%, by weight of ethylenically unsaturated nonsilane containing monomers and about 5–70%, preferably 10–60%, by weight of ethylenically unsaturated silane-containing monomers, based on the weight of the organosilane polymer. Suitable ethylenically unsaturated nonsilane containing monomers are alkyl acrylates, alkyl methacrylates and mixtures thereof, where the alkyl groups have 1–12 carbon atoms, preferably 3–8 carbon atoms.

The film-forming component of the coating composition is referred to as the "binder" and is dissolved, emulsified or otherwise dispersed in an organic solvent or liquid carrier. The binder generally includes all the components that contribute to the solid organic portion of the cured composition. Generally, pigments, and chemical additives such as stabilizers are not considered part of the binder. Non-binder solids other than pigments typically do not exceed about 5% by weight of the composition. The term "binder" includes the oligomer of the present invention, the organosilane polymer, the dispersed polymer, and all other optional film-forming components. The coating composition contains about 50–100% by weight of the binder and about 0–50% by weight of the organic solvent carrier.

Suitable alkyl methacrylate monomers used to form the silane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, such as trimethylcyclohexyl methacrylate, trimethylcyclohexyl acrylate, iso-butyl cyclohexyl methacrylate, t-butyl cyclohexyl acrylate, and t-butyl cyclohexyl methacrylate. Aryl acrylate and aryl methacrylate also can be used, such as benzyl acrylate and benzyl methacrylate. Mixtures of two or more of the above-mentioned monomers are also suitable.

In addition to alkyl acrylates and methacrylates, other polymerizable nonsilane-containing monomers, up to about 50% by weight of the polymer, can be used in the silane modified acrylic polymer for the purpose of achieving the desired properties such as hardness; appearance; mar, etch and scratch resistance, and the like. Exemplary of such other monomers are styrene, methyl styrene, acrylamide, acrylonitrile, methacrylonitrile, hydroxyethyl acrylate, methacrylic acid and the like.

EXAMPLES

Example 1—Preparing a Silane-Containing Acrylic Polymer

A silane-containing acrylic polymer is prepared similar to those listed in U.S. Pat. No. 4,499,150. A flask equipped with condenser, stirrer, and thermometer was charged with 218.4 g butyl acetate, 93.6 g VM&P naphtha and 62.4 g toluene and then heated to reflux. Three charges were simultaneously added over a two hour period, under a nitrogen blanket:
Charge I: 582.4 g methyl methacrylate, 291.2 g butyl acrylate, 364.0 g styrene and 218.4 g. gamma-methacryloxypropyltrlmethoxysilane.
Charge II: 125 g butyl acetate, and 72.8 g di-t-butyl peroxide
Charge III: 124.8 g butyl acetate and 72.8 g gamma-mercaptopropyltrimethoxysilane.
Upon the completion of these charges, additional peroxide (5.85 g ) was added and the mixture was allowed to reflux for 1.5 hours to assure the completeness of the polymerization. The final resin has a solid content of 69 percent, a Gardner-Holt viscosity of Z+.

Examples for Preparing the Hydrosilylated Vinyl Silane Oligomers

Example 2

To 444.6 g (3.0 moles) of vinyltrimethoxysilane in a 1 l. three-necked flask was quickly added 115.1 g (2.5 moles) 99% formic acid at room temperature. The flask was protected with nitrogen and over 3 hours a combination of methyl formate and methanol (a total of 241.7 g) were distilled from the reaction mixture, producing 310.9 g of partially hydrolyzed and condensed vinylmethoxysiliconate of 0.5 cstks viscosity.

The above reaction mixture was heated to 100° C. and 0.29 g of platinum-divinyltetramethyldisiloxane complex, containing 1.9% Pt, (Karstedt's catalyst; see U.S. Pat. No. 3,775,452) was added. From an addition funnel, 366.0 g (3.0 moles) of trimethoxysilane was added, maintaining the addition rate to sustain a reaction temperature of 110–120° C. After the addition was complete (4 hours), the flask was heated to 150° C., whereupon a small amount of black precipitate (platinum metal) formed. The product was cooled and filtered to produce a clear, colorless liquid of 32 cstks. viscosity.

Example 3

In a procedure similar to Example 2, 444.6 g of vinyltrimethoxysilane was allowed to react with 115.1 g 99% formic acid. During the distillation of volatile components, the flask was heated to 150° C. to distill unreacted vinyltrimethoxysilane. The flask was cooled to 85° C. and 0.29 g of Karstedt's catalyst was added and 366.0 g distilled triiethoxysilane was slowly added, maintaining the temperature of the exothermic reaction between 85–100° C. by the rate of addition of trimethoxysilane. After the reaction was complete, the flask was heated to 150° C., precipitating a small amount of Pt on the walls of the flask. The excess trimethoxysilane was distilled from the reaction mixture. Upon cooling and filtering, 390 g of clear colorless product of 41 cstks. viscosity was isolated. Analysis by $^{13}C$ NMR indicated 78% hydrosilation of the original vinyl groups present.

Example 4

Following Example 2, 48.9 g (0.33 mole) of vinyltrimethoxysilane and 29.8 g (0.17 mole) of 2-cyanoethyltrimethoxysilane were treated with 19.4 g (0.42 mole) of 99% formic acid. The flask contents were heated to 85° C. for 2 hours and the low boiling components were vacuum distilled. Hydrosilylation of the co-oligomeric reaction product with 40.3 g (0.33 mole) of trimethoxysilane and 0.04 g Karstedt's catalyst at 110–120° C., distilling the excess trimethoxysilane to 150° C. The residual catalyst was filtered, yielding a light yellow composition of 14 cstks. viscosity. Analysis by $^{13}C$ NMR indicated 75% hydrosilation of the original vinyl groups present.

Example 5

Following Example 2, 37.1 g (0.25 mole) of vinyltrimethoxysilane and 52.1 g (0.25 mole) of 2-acetoxyethyltrimethoxysilane were treated with a total of 22.1 g (0.48 mole) of 99% formic acid. In this example, the 2-acetoxyethyltrimethoxysilane was allowed to react with 9.7 g (0.21 mole) of formic acid before the addition of the vinyl silane. After distillation of the low boiling components, hydrosilylation of the co-oligomeric reaction product with 30.5 g (0.25 mole) of trimethoxysilane and 0.03 g Karstedt's catalyst at 110–120° C., distilling the excess trimethoxysilane to 150° C. The residual catalyst was filtered, yielding a colorless composition of 50 cstks. viscosity. Analysis by $^{13}C$ NMR indicated>90% hydrosilation of the original vinyl groups present.

Example 6

Following Example 2, 24.5 g (0.165 mole) of vinyltrimethoxysilane and 16.9 g (0.085 mole) of phenyltrimethoxysilane were treated with a total of 11.1 g (0.24 mole) of 99% formic acid. After distillation of the low boiling components, hydrosilylation of the co-oligomeric reaction product with 20.1 g (0.165 mole) of trimethoxysilane and 0.01 g Karstedt's catalyst at 110–120° C., distilling the excess trimethoxysilane to 150° C. The residual catalyst was filtered, yielding a colorless composition of 100 cstks. viscosity. Analysis by $^{13}C$ NMR indicated>80 % hydrosilation of the original vinyl groups present.

Example 7

Following Example 2, 18.5 g (0.125 mole) of vinyltrimethoxysilane and 29.1 g (0.125 mole) of 7-octenyltrimethoxysilane were treated with a total of 11.0 g (0.24 mole) of 99% formic acid. In this example, the 7-octenyltrimethoxysilane was allowed to react with 4.8 g of formic acid for 1 hour at 84–89° C. before the addition of the vinyl silane. The remaining 6.2 g of formic acid were added and the flask heated for 8 hours at 90–1 10C. After distillation of the low boiling components, complete hydrosilylation of both of the olefinic moieties of the co-oligomeric reaction product was attempted with 30.5 g (0.25 mole) of trimethoxysilane and 0.074 g Karstedt's catalyst at 100–120° C., distilling the excess trimethoxysilane to 150° C. The residual catalyst was filtered, yielding a yellow material of 85 cstks. viscosity.

Example 8

Following Example 2, 48.9 g (0.33 mole) of vinyltrimethoxysilane and 38.5 g (0.17 mole) of 2-phenethyltrimethoxysilane were treated with a total of 22.1 g (0.48 mole) of 99% formic acid. After distillation of the low boiling components, hydrosilylation of the co-oligomeric reaction product with 40.3 g (0.33 mole) of trimethoxysilane and 0.05 g Karstedt's catalyst at 120–130° C., distilling the excess trimethoxysilane to 150° C. The residual catalyst was filtered, yielding a straw colored composition of 50 cstks. viscosity.

Example 9

Following Example 2, 24.5 g (0.165 mole) of vinyltrimethoxysilane, 32.7 g (0.165 mole) of 2-phenyltrimethoxysilane, and 25.1 g (0.165 mole) of tetramethoxysilane were treated with a total of 19.3 g (0.42 mole) of 99% formic acid for 4 hours at 87–100° C. After distillation of the low boiling components, hydrosilylation of the co-oligomeric reaction product with 20.3 g (0.165 mole) of triretthoxysilane and 0.05 g Karstedt's catalyst at 102–145° C., distilling the excess trimethoxysilane to 150° C. The residual catalyst was filtered, yielding a clear, colorless product of 14 cstks. viscosity.

Example 10

To a solution containing 59.3 g (0.4 mole) vinyltrimethoxysilane, 54.8 g (0.4 mole) of methyltrimethoxysilane, and 60.9 g (0.4 mole) of tetramethoxysilane in a round bottomed flask was added 66 g (1.15 moles) of glacial acetic acid and 0.9 g (0.5 wt %) of PUROLITE C-175 acidic dry ion exchange resin (manufactured by Purolite Company, division of Bro Tech Corp.). The flask contents were heated to 90° C. for several hours, followed by distillation of 122 g methanol and methyl acetate. The vinyl containing oligomer in the flask then was hydrosilylated with 49 g (0.4 mole) of trimethoxysilane and 0.04 g Karstedt's catalyst at 115–145° C. The final product, after removal of the low boiling components and filtration to remove any solid materials, was 145 g and was 65 cstks. viscosity.

Example 11

In a reaction similar to example 10, solution containing 59.3 g (0.4 mole) vinyltrimethoxysilane, 54.8 g (0.4 mole) of methyltrimethoxysilane, and 60.9 g (0.4 mole) of tetramethoxysilane in a round bottomed flask was added 52.9 g (1.15 moles) of 99% formic acid and 0.9 g (0.5 wt %) of PUROLITE C-175 acidic dry ion exchange resin. The flask was heated to 85–100° C. to distill the produced methanol and methyl formate collecting a total of 99.1 g. The reaction mixture was then filtered, removing the ion exchange resin. The 110.8 g vinyl containing oligomer was then hydrosilylated with 49 g (0.4 mole) of trimethoxysilane and 0.04 g Karstedt's catalyst at 118–144° C. The final product, after removal of the low boiling components and filtration to remove any solid materials, was 153.6 g and was 27 cstks. viscosity.

Example 12

In a reaction similar to example 10, solution containing 59.3 g (0.4 mole) vinyltrimethoxysilane, 54.8 g (0.4 mole) of methyltrimethoxysilane, and 60.9 g (0.4 mole) of tetramethoxysilane in a round bottomed flask was added 20.7 g (1. 15 moles) of distilled water and 0.9 g (0.5 wt %) of PUROLITE C-175 acidic ion exchange resin. The reaction mixture was stirred at ambient temperature for one hour then vacuum distilled, removing 71 g of low boiling components (mostly methanol). The reaction mixture was filtered, leaving 116 g of 5 vinyl oligomer. This component then was hydrosilylated with 49 g (0.4 mole) of triethoxysilane and 0.04 g Karstedt's catalyst at 110–146° C. The final product, after removal of the low boiling components and filtration to remove any solid materials, was 161 g and was 14 cstks viscosity.

Examples for Viscosity Reducing Properties

Example 13

The silane oligomers (20 g) of the examples above were blended with 100 g of the silane-containing acrylic polymer (Ex. 1). The Gardner-Holt viscosity and the solid contents of the resultant mixtures were measured and the results are shown:

| Sample | Viscosity | % Solid Silane | Visc. 1 w. Resin | % Solid mixture |
|---|---|---|---|---|
| Resin | Z+ | 69% | Z+ | 69% |
| Exp. 3 | 41 cstks | 92% | X – Y | 73% |
| Exp. 4 | 14 cstks | 85% | X+ | 71% |
| Exp. 5 | 50 cstks | 92% | Y – Z | 73% |
| Exp. 6 | 100 cstks | 93% | Y – Z | 73% |
| Exp. 7 | 85 cstks | 94% | Z– | 73% |
| Exp. 8 | 50 cstks | 87% | Y – Z | 72% |
| Exp. 9 | 14 cstks | 76% | X+ | 70% |

The viscosity reducing properties of these compounds were evaluated in another way. The viscosities of these mixtures were measured using Ford Cup, #4. Since the resin (Ex. 1) was very viscous, the resin was diluted with a solvent mixture containing 75 % toluene and 25 % xylene. So to 85 g of the resin was added 15 g of the solvent mixture. The resultant resin mixture was found to have a solid content of 59% and the Ford Cup #4 viscosity of 147 seconds. To the above resin mixture was added 18.4 g of the silane oligomers or copolymers, the viscosities and the percent solid contents were measured:

| Sample | Viscosity | % NVC silane | Ford Cup #4 sec. | % NVC mixture |
|---|---|---|---|---|
| Resin | — | 59% | 147 | 59% |
| Example 3 | 41 cstks | 92% | 107 | 64% |
| Example 4 | 14 cstks | 85% | 94 | 63% |
| Example 5 | 50 cstks | 92% | 116 | 66% |
| Example 6 | 100 cstks | 93% | — | — |
| Example 7 | 85 cstks | 94% | 126 | 65% |
| Example 8 | 50 cstks | 87% | 109 | 64% |
| Example 9 | 14 cstks | 89% | 104 | 62% |

Examples for Improved Physical Properties

The silane oligomers were formulated with the silane-containing acrylic polymer (Ex. 1) according to Table A and the resultant mixture was coated on the E-coated panel and cured at 130° C. for 30 minutes. The properties of these coatings were listed in Table B.

TABLE A

| Coating Composition | Percent by Weight | Percent by Wt. |
|---|---|---|
| silane-containing acrylic polymer[1] | 83.1% | 92.8% |
| Silane Oligomers | 9.9% | — |
| Dibutyltin dilaurate[2] | 1.0% | 0.9% |
| Blocked acid[3] | 1.5% | 1.9% |
| UV absorber[4] | 0.9% | 1.0% |
| Polysiloxane[5] | 1.7% | 2.0% |
| Triethylorthoformate | 1.9% | 1.5% |

[1]To 100 grams of the acrylic silane polymer was added a solvent mixture consists of 8.6% butyl acetate, 11.9% acetone, 16.8% toluene, 56.4% xylene, 4% Cellosolve acetate (ethylene glycol monoethyl ether acetate), 2.3% butyl carbitol acetate (diethylene glycil monobutyl ether acetate).
[2]10 wt. % solution in xylene.
[3]NACURE 5925 amine blocked dodecyl benzene sulfonic acid from King Industries.
[4]TINUVIN 328 U.V. light absorber, product of Ciba-Geigy, Inc.
[5]DC 200 from Dow Corning Corp., dissolved in xylene to give a 0.54 wt. % solution.

TABLE B

| Sample | Gloss 20°[1] | Gloss 60°[1] | DOI[2] | Pencil Hardness[3] |
|---|---|---|---|---|
| Resin | 88 | 94 | 100 | 2B |
| Example 3 | 84 | 92 | 100 | 2B |
| Example 4 | 84 | 93 | 100 | 2B |
| Example 5 | 84 | 91 | 100 | 2B |
| Example 6 | 86 | 93 | 100 | 2B |
| Example 7 | 81 | 91 | 100 | 2B |
| Example 8 | 86 | 93 | 100 | 3B |
| Example 9 | 86 | 92 | 100 | 2B |

[1]ASTM D-523
[2]Distinctness of Image
[3]ASTM D-3363-74

We claim:

1. A composition comprising:
   (a) 10 to 80 percent by weight of a silane oligomer of the formula $$[R_3SiO_{1/2}]_m[O_{1/2}Si(R_2)O_{1/2}]_n[SiO_{3/2}R]_o[SiO_{4/2}]_p$$

wherein
   Each R is selected individually from the group consisting of B, $R^1$, —$OR^1$ and W;
   wherein
   B is a silane group bridged by other than an Si—O bond to the Si atom of the siloxane oligomer backbone;
   Each $R^1$ is individually a hydrocarbon group of 1 to 10 carbon atoms;
   each W individually is a monovalent radical;
   with the proviso that at least one R is a B and at least one-quarter of the R groups are $OR^1$;
   m=2 to 20;
   n=0 to 50;
   o=0 to 10; and
   p=0 to 5; and
   (b) 20 to 90%, by weight of a film-forming reactive silane polymer of a number average molecular weight of about 500 to 10,000 which silane polymer is the product of about 30–95%, by weight of ethylenically unsaturated nonsilane containing monomers and about 5–70%. by weight of ethylenically unsaturated silane-containing monomers.

2. A composition according to claim 1 wherein B is —$C_fH_{2f}$—$SiR^2_g(X)_{3-g}$ wherein f=2 to 12, g=0 to 2, X is a halogen or —$OR^2$, and each $R^2$ is selected from W and $R^1$.

3. A composition according to claim 1 wherein m+n+o+p<50.

4. A composition according to claim 3 wherein W is an unsaturated non-aromatic hydrocarbon, hydroxy, an amine, an ester, a polyalkylene oxide, a thioester, an amide, a carbamate, an epoxy, cyano, polysulfide, or isocyanurate.

5. A composition according to claim 4 wherein at least half of the R groups are —OR$^1$.

6. A composition according to claim 5 wherein o=0, m=2 and n=0 to 15.

7. A composition according to claim 6 wherein —OR$^1$ is methoxy or ethoxy.

8. A composition according to claim 7 wherein B is selected from the group consisting of: —(CH$_2$)$_2$Si(OCH$_3$)$_3$; —(CH$_2$)$_2$Si(OC$_2$H$_5$)$_3$—(CH$_2$)$_2$Si(OCH$_3$)$_2$(CH$_3$); —(CH$_2$)$_2$Si(OCH$_3$)$_2$Cl; —C$_2$H$_4$(C$_6$H$_9$)(C$_2$H$_4$Si(OCH$_3$)$_3$)$_2$; —C$_2$H$_4$(C$_5$H$_8$)C$_2$H$_4$Si(OC$_2$H$_5$)$_3$; and —C$_2$H$_4$Si(OCH$_3$)$_2$(OSi(OCH$_3$)$_3$).

9. A method comprising:
A. condensing either (a) an unsaturated alkyl alkoxy silane or (b) a hydrido alkoxy silane to form a siloxane oligomer; and
B. Reacting via a hydrosilane reaction the siloxane oligomer with either a (c) hydrido alkoxy silane or (d) an unsaturated alkyl alkoxy silane, if (a) or (b), respectively, were used to form the oligomer in step A, to form a silane of the formula

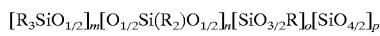

wherein
Each R is selected individually from the group consisting of B, R$^1$, —OR$^1$ and W;
wherein
B is a silane group bridged by other than an Si—O bond to the Si atom of the siloxane oligomer backbone;
Each R$^1$ is individually a hydrocarbon group of 1 to 10 atoms;
each W individually is a monovalent radical;
with the proviso that at least one R is a B and at least half of the R groups are —OR$^1$;
m=2 to 20;
n=0 to 50;
o=0 to 10; and
p=0 to 5.

10. A method according to claim 9 wherein at least half of the R groups are —OR$^1$.

11. A method according to claim 10 wherein during step A, a tetra alkoxy silane is present.

12. A method according to claim 11 wherein the alkoxysilane oligomer is formed from an unsaturated alkoxy silane.

13. A method according to claim 12 wherein the unsatured alkoxy silane is a vinyl trialkoxy silane.

14. A method according to claim 13 wherein the condensation step A takes place in the presence of an ion exchange resin.

* * * * *